United States Patent
Chen et al.

(10) Patent No.: US 11,501,649 B2
(45) Date of Patent: Nov. 15, 2022

(54) DRONE CONTROL METHOD AND DEVICE AND DRONE

(71) Applicant: AUTEL ROBOTICS CO., LTD., Guangdong (CN)

(72) Inventors: Yidong Chen, Guangdong (CN); Xiangxi Pan, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 441 days.

(21) Appl. No.: 16/665,701

(22) Filed: Oct. 28, 2019

(65) Prior Publication Data
US 2020/0066167 A1    Feb. 27, 2020

Related U.S. Application Data

(63) Continuation of application No. PCT/CN2018/078712, filed on Mar. 12, 2018.

(30) Foreign Application Priority Data

Apr. 26, 2017    (CN) .......................... 201710280239.2

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *B64D 31/10* (2013.01);
(Continued)

(58) Field of Classification Search
CPC .. G08G 5/0069; G08G 5/0013; G08G 5/0056; B64C 39/024; B64C 2201/14;
(Continued)

(56) References Cited

U.S. PATENT DOCUMENTS 6,456,946 B1 *  9/2002  O'Gorman ........... B62D 5/0487
                                                702/58
9,422,055 B1 *  8/2016  Beckman .............. B64C 39/024
(Continued)

FOREIGN PATENT DOCUMENTS

CN    103344240 A    10/2013
CN    105572585 A     5/2016
(Continued)

OTHER PUBLICATIONS

The International Search Report dated Jun. 4, 2018; PCT/CN2018/078712.

*Primary Examiner* — Muhammad Shafi

(57) ABSTRACT

This application discloses a drone control method and device and a drone and pertains to the technical field of drone control. The method includes: monitoring a running status of each power motor in a drone; determining according to the running status of each power motor whether the drone is in a crashed state; and controlling the drone to alarm when determining that the drone is in the crashed state. The drone control method and device and the drone can rapidly locate a crashed drone, greatly increasing the probability of finding back the crashed drone.

18 Claims, 4 Drawing Sheets

(51) Int. Cl.
*B64D 31/10* (2006.01)
*B64D 45/04* (2006.01)
*G05D 1/00* (2006.01)
*G05D 1/10* (2006.01)

(52) U.S. Cl.
CPC ........... *B64D 45/04* (2013.01); *G05D 1/0022* (2013.01); *G05D 1/0072* (2013.01); *G05D 1/10* (2013.01); *B64C 2201/14* (2013.01); *B64D 2203/00* (2013.01); *B64D 2221/00* (2013.01); *G05D 2201/0207* (2013.01)

(58) Field of Classification Search
CPC .. B64C 2201/042; B64D 31/10; B64D 45/04; B64D 2203/00; B64D 2221/00; B64D 2045/0065; B64D 2045/008; G05D 1/0022; G05D 1/0072; G05D 1/10; G05D 2201/0207; G05D 1/101; G07C 5/08
USPC ............................................................ 701/3
See application file for complete search history.

(56) References Cited

U.S. PATENT DOCUMENTS

| | | | |
|---|---|---|---|
| 2015/0266579 A1 | 9/2015 | Alzaidi | |
| 2015/0336671 A1* | 11/2015 | Winn | G05D 1/0202 701/3 |
| 2016/0149534 A1* | 5/2016 | Guo | B60L 3/003 318/461 |

FOREIGN PATENT DOCUMENTS

| | | | |
|---|---|---|---|
| CN | 106020238 A | | 10/2016 |
| CN | 106054918 A | | 10/2016 |
| CN | 205738120 U | | 11/2016 |
| CN | 205916347 | * | 2/2017 |
| CN | 205916347 U | | 2/2017 |

\* cited by examiner

US 11,501,649 B2

DRONE CONTROL METHOD AND DEVICE AND DRONE

This application claims priority to Chinese Patent Application No. 201710280239.2, entitled "Drone control method and device and drone" filed on Apr. 26, 2017, which is incorporated by reference in its entirety.

BACKGROUND

Technical Field

This application relates to the technical field of drone control, and more particularly to a drone control method and device and a drone.

Related Art

Drone is a reusable unmanned aerial vehicle operable to execute various tasks. The flight of the drone can be controlled using a wireless remote control and a control device of the drone.

With the rapid development of drone technologies, the stability of drones has been improved greatly. However, factors such as harsh flight environment or improper operation of the user may affect the normal flight of the drone or even lead to crashing of the drone.

Currently, after the drone crashes and falls onto the ground, manual search is required in order to find the location of the crashed drone, and the crashed drone cannot be located rapidly, greatly reducing the probability of finding back the crashed drone.

SUMMARY

To resolve the technical problem in the related art that the crashed drone cannot be located rapidly, this application provides a drone control method and device and a drone.

According to a first aspect, embodiments of this application provide a drone control method, including:

monitoring a running status of each power motor in a drone;

determining according to the running status of each power motor whether the drone is in a crashed state; and controlling the drone to alarm when determining that the drone is in the crashed state.

According to a second aspect, the embodiments of this application provide a drone control device, including:

a power motor monitoring module, configured to monitor a running status of each power motor in a drone;

a crashed state determining module, configured to determine according to the running status of each power motor whether the drone is in a crashed state; and an alarm module, configured to control the drone to alarm when determining that the drone is in the crashed state.

According to a third aspect, the embodiments of this application provide a drone, including:

at least one processor; and a memory communicably connected to the at least one processor, the memory storing instructions executable by the at least one processor, execution of the instructions by the at least one processor causing the at least one processor to execute the method according to the first aspect.

The technical solutions provided in the embodiments of this application may include the following beneficial effects: by monitoring a running status of each power motor in a drone and controlling the drone to alarm after determining that the drone is in a crashed state, the drone control method and device and the drone can rapidly locate a crashed drone, greatly increasing the probability of finding back the crashed drone.

It should be understood that the above general descriptions and the following detailed descriptions are merely exemplary, and cannot limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DETAILED DESCRIPTION

Exemplary embodiments are described in detail herein, and examples of the exemplary embodiments are shown in the accompanying drawings. The implementations described in the following exemplary embodiments do not represent all implementations consistent with this application. On the contrary, the implementations are merely examples of apparatuses and methods that are described in detail in the appended claims and that are consistent with some aspects of this application.

Figure 1:
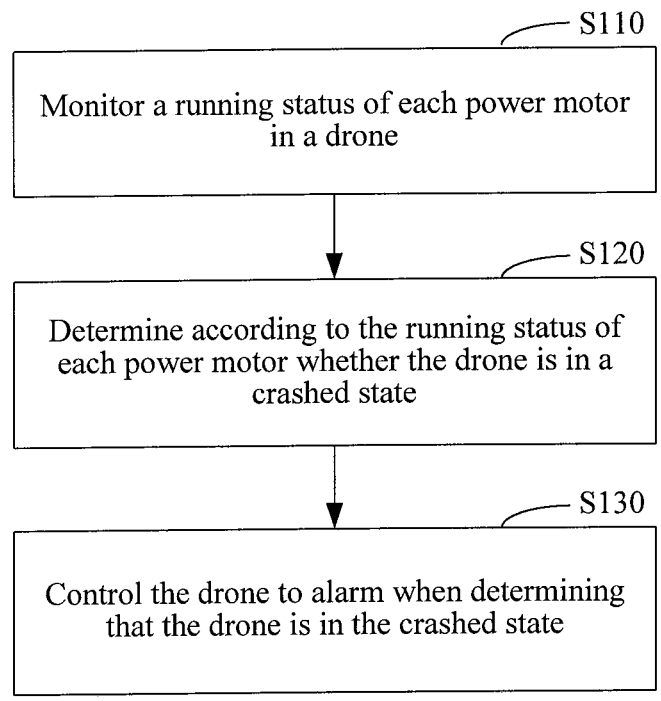
FIG. 1 is a flowchart of a drone control method according to an exemplary embodiment.

FIG. 1 is a flowchart of a drone control method according to an exemplary embodiment. As shown in FIG. 1, the drone control method may include the following steps.

In step S110, a running status of each power motor in a drone is monitored.

Drone is a reusable unmanned aerial vehicle operable to execute various tasks. The drone is equipped with a power motor configured to drive a propeller and a gimbal motor configured to ensure the stability of the drone.

The power motor is the core power of the drone. The flight of the drone powered by the power motor is controlled using a wireless remote control and a control device of the drone.

Therefore, the power motor is quite important to the drone, and the running status of the power motor directly influences the flight status of the drone.

Generally, the drone is equipped with at least one power motor. The power motors are independent of each other, and the running of one power motor does not affect the running of other power motors. Therefore, the running statuses of the power motors in the drone need to be monitored respectively.

In a specific exemplary embodiment, the running status of the power motor includes a normal running state, the shutdown state, a faulty running state and so on.

It is to be understood that some of running characteristics of the power motor vary with different running states. For example, the working current, the rotational speed and the like of the power motor vary.

For example, the working current of the power motor in the faulty running state caused by rotor locking is 7 times that in the normal running state.

Therefore, the running status of the power motor is monitored by identifying different operating characteristics of the power motor.

In step S120, it is determined according to the running status of each power motor whether the drone is in a crashed state.

The crashed state is a state of the drone in which the drone cannot fly normally due to damage to its internal structure resulting from factors such as harsh flight environment or improper operation of the user.

It should be noted that, when the drone is in the crashed state, some or none of the power motors can run normally.

Therefore, it is determined whether the drone is in the crashed state by monitoring the running status of each power motor in the drone.

For example, all the power motors in the drone are faulty, and when detecting that the running statuses of all the power motors in the drone are the faulty running state, it is determined that the drone is in the crashed state.

For another example, when it is detected that more than half of the total quantity of power motors in the drone are in the faulty running state, it is determined that the drone is in the crashed state.

In step S130, the drone is controlled to alarm when determining that the drone is in the crashed state.

When the drone is in the crashed state, the drone cannot fly normally and will fall to a certain location. Controlling the drone to alarm when determining that the drone is in the crashed state makes it convenient to search for the drone.

There may be various methods for controlling the drone to alarm. For example, the drone may be controlled to alarm with a sound or to alarm with an indicator light or to alarm in other manners. The specific form of alarm is not limited herein.

By means of the above method, by monitoring the running status of each power motor in the drone and controlling the drone to alarm when determining that the drone is in the crashed state, the crashed drone can be rapidly located, greatly increasing the probability of finding back the crashed drone.

Figure 2:
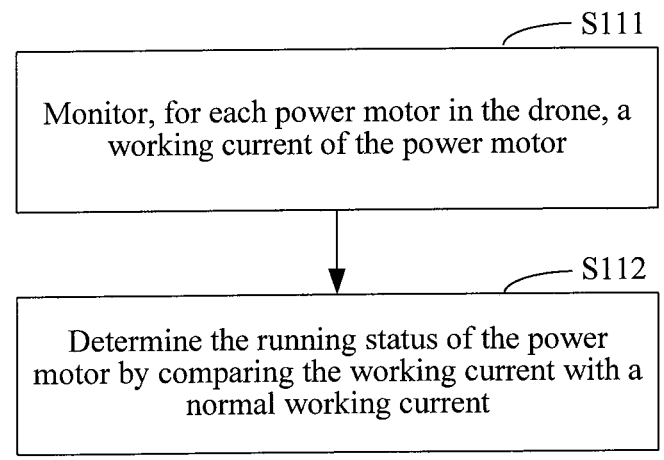
FIG. 2 is a flowchart of a specific implementation of step S110 in the drone control method in the embodiment shown in FIG. 1.

FIG. 2 is a further detailed description of step S110 in the drone control method in the embodiment shown in FIG. 1. As shown in FIG. 2, step S110 may include the following steps.

In step S111, for each power motor in the drone, a working current of the power motor is monitored.

It should be noted that, when in the normal running state, the working current of the power motor is in a normal range.

A current detection circuit is disposed in the power motor to detect the working current in the power motor.

In step S112, the running status of the power motor is determined by comparing the working current with a normal working current.

As described above, the working current of the power motor is not in the normal range, indicating that the running status of the power motor is not the normal running state.

For example, the power motor is faulty and rotor locking occurs. When it is detected that rotor locking occurs in the power motor, the working current of the power motor in the locked-rotor state will be about 7 times that in the normal running state.

It is to be understood that if power is still outputted when the rotational speed of the power motor is zero due to a serious fault such as rotor locking, the power motor will burn due to overheat.

Generally, when a serious fault occurs in the power motor, the power motor is controlled to enter the shutdown state, to stop the power output when the rotational speed of the power motor is zero, thereby protecting the power motor from irreparable damage.

In the shutdown state, the working current of the power motor is zero, which is not in the normal range. Therefore, during running of the drone, if the working current of a power motor is not in the normal range, it is determined that the power motor is not in the normal running state.

By means of the above method, by monitoring the working current in the power motor to determine whether the running status of the power motor is in the normal running state and controlling the drone to alarm when determining according to the running status of each power motor in the drone that the drone is in the crashed state, the crashed drone can be rapidly located, greatly increasing the probability of finding back the crashed drone.

Figure 3:
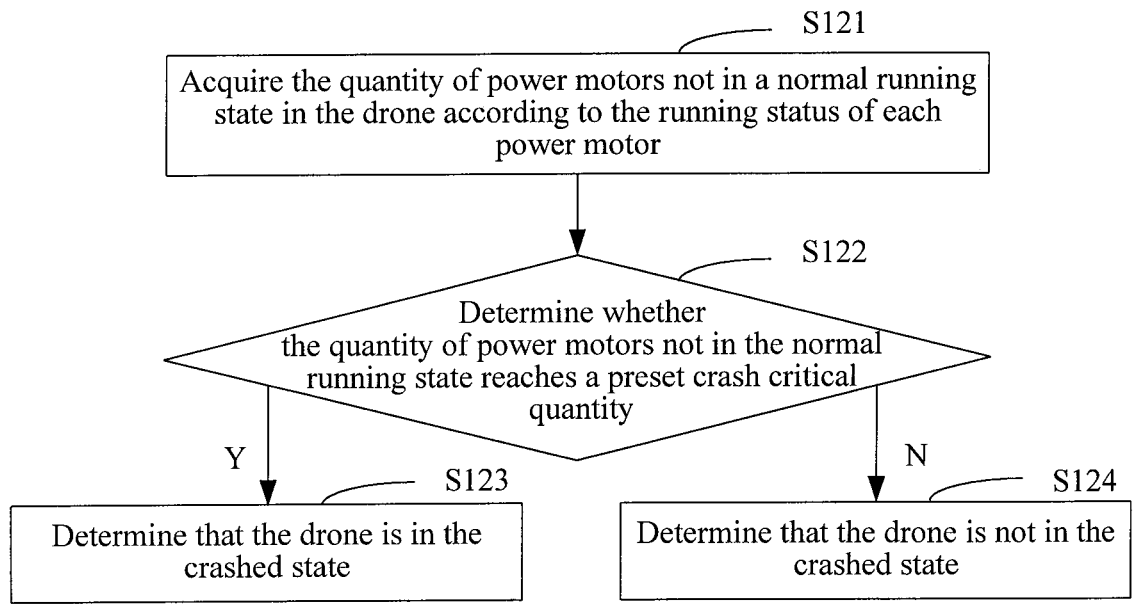
FIG. 3 is a flowchart of a specific implementation of step S120 in the drone control method in the embodiment shown in FIG. 1.

FIG. 3 is a further detailed description of step S120 in the drone control method in the embodiment shown in FIG. 1. As shown in FIG. 3, step S120 may include the following steps.

In step S121, the quantity of power motors not in a normal running state in the drone is acquired according to the running status of each power motor.

As described above, by monitoring the running statuses of the power motors in the drone, the running status of each power motor in the drone is acquired.

Therefore, according to the running status of each power motor, the quantity of power motors not in the normal running state is calculated.

In step S122, it is determined whether the quantity of power motors not in the normal running state reaches a preset crash critical quantity; if yes, perform step S123, or if not, perform step S124.

The crash critical quantity is preset, and is a threshold of the quantity of power motors based on which it is determined whether the drone is in the crashed state.

It is determined whether the drone is in the crashed state by comparing the quantity of power motors not in the normal running state with the crash critical quantity.

If the quantity of power motors not in the normal running state is greater than or equal to the crash critical quantity, it is determined that the drone is in the crashed state; if the quantity of power motors not in the normal running state is less than the crash critical quantity, it is determined that the drone is not in the crashed state.

For example, the drone is equipped with four power motors, and when the running statuses of two power motors are the abnormal running state, it is determined that the drone is in the crashed state.

In step S123, it is determined that the drone is in the crashed state.

In step S124, it is determined that the drone is not in the crashed state.

By means of the above method, by determining that the drone is in the crashed state when determining that the quantity of power motors not in the normal running state reaches the preset crash critical quantity according to the running status of each power motor in the drone and further controlling the drone to alarm, the crashed drone can be rapidly located, greatly increasing the probability of finding back the crashed drone.

Optionally, according to the drone control method in the embodiment shown in FIG. 1, before step S130, the drone control method may further include the following step: controlling, for the drone in the crashed state, all the power motors of the drone to enter a shutdown state.

As described above, when the drone is in the crashed state, the drone cannot fly normally.

In this case, the power motor in the drone cannot power the drone to fly. Therefore, by controlling all the power motors in the drone in the crashed state to enter the shutdown state, the waste of power in the drone resulting from useless running of some power motors in the drone is avoided, and damage to these power motors is also avoided.

Optionally, according to an exemplary embodiment providing a further detailed description of step S130 in the drone control method shown in the foregoing embodiment, step S130 may include the following step:

controlling, for the drone in the crashed state, the power motors in the drone to produce an alarm sound.

There may be various methods for controlling the power motors in the drone to produce an alarm sound. For example, the current in the power motor may be controlled, so that under the action of the current, the power motor vibrates and produces an alarm sound; or a sound producing circuit may be additionally disposed in the power motor, and when the drone is in the crashed state, the sound producing circuit is started to produce an alarm sound in the power motor; or the power motor may also be controlled to produce an alarm sound in other manners, which are not limited herein.

In a specific exemplary embodiment, for the drone in the crashed state, a bias voltage of a driving metal oxide semiconductor (MOS) transistor in the power motor is controlled through pulse width modulation (PWM) to adjust the amplitude and frequency of the current in the power motor, so that under the action of the current, the power motor experiences electromagnetic oscillation to produce an alarm sound.

In another specific exemplary embodiment, a sound producing circuit is additionally disposed in the power motor. The sound producing circuit includes a speaker. When the drone is in the crashed state, the sound producing circuit is started, so that the speaker works to produce a sound as an alarm in the power motor.

Optionally, when the drone is in the crashed state, all the power motors of the drone are controlled to enter the shutdown state, and all the power motors are caused to produce a sound, thereby increasing the intensity of the alarm sound.

By means of the above method, by controlling the power motors of the drone to produce a sound as an alarm when determining that the drone is in the crashed state, the crashed drone can be rapidly located, greatly increasing the probability of finding back the crashed drone.

Optionally, according to an exemplary embodiment providing a further detailed description of step S130 in the drone control method shown in the foregoing embodiment, step S130 may include the following step:

controlling, for the drone in the crashed state, an alarm indicator light of the drone to flash as an alarm.

The drone is equipped with an alarm indicator light. When the drone is in the crashed state, the alarm indicator light of the drone is controlled using an electronic speed controller, to cause the alarm indicator light to flash as an alarm.

In a specific exemplary embodiment, the drone is equipped with alarm indicator lights. The alarm indicator lights are mounted on the body of the drone. When the drone is in the crashed state, the alarm indicator lights mounted on the body of the drone are controlled to enter a red flashing state, providing a clue for search of the crashed drone.

By means of the above method, by controlling the alarm indicator light in the power motor to flash as an alarm when determining that the drone is in the crashed state, the crashed drone can be rapidly located, greatly increasing the probability of finding back the crashed drone.

Figure 4:
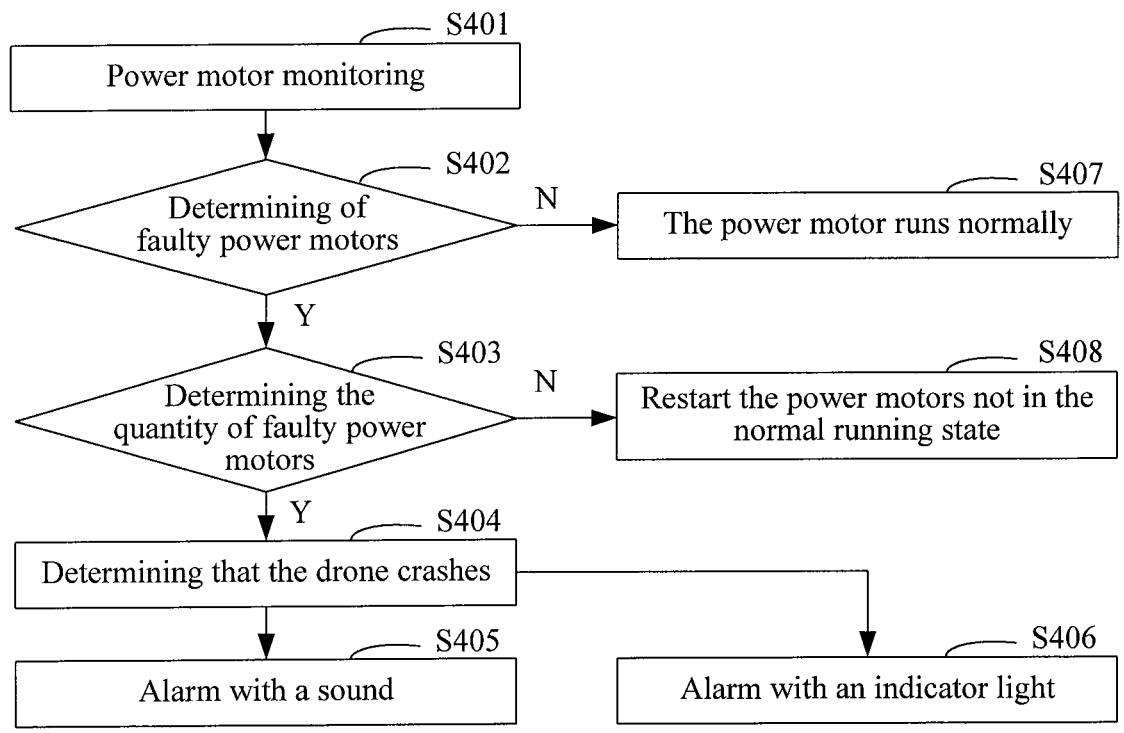
FIG. 4 is a schematic diagram of a specific application scenario of performing drone control according to an exemplary embodiment.

The foregoing drone control method will be described in detail with reference to a specific application scenario. The drone control method is run in a drone. The method is specifically as shown in FIG. 4.

Step S401. Power motor monitoring: For each power motor in the drone, a working current of the power motor is monitored.

Step S402. Determining of faulty power motors: Determining according to the working current whether there is a power motor not in the normal running state. If yes, step S403 is performed to determine the quantity of faulty power motors. For example, there are a total of four power motors in the drone. In an implementation, it is determined whether the quantity of power motors not in the normal running state is greater than 2; if not, step S407 is performed: The power motor runs normally.

When the quantity of power motors not in the normal running state in the drone is greater than or equal to 2 (Y), step S404 is performed: Determining that the drone crashes: Determining that the drone is in the crashed state, and controlling all the power motors to enter the shutdown state. When the quantity of power motors not in the normal running state in the drone is less than 2 (N), step S408 is performed: Restarting the power motors not in the normal running state.

Step S405. Alarm with a sound: For the drone in the crashed state, pulse width modulation (PWM) periods and duty cycles in the power motors of the drone are controlled to adjust currents of the power motors, to cause the motors to vibrate and produce a sound. Step S406. Alarm with an indicator light: For the drone in the crashed state, an alarm indicator light of the drone is controlled to flash as an alarm.

Device embodiments of this application are provided below, which can be used to implement the embodiments of the drone control method. For details not disclosed in the device embodiments of this application, reference can be made to the embodiments of the drone control method of this application.

Figure 5:
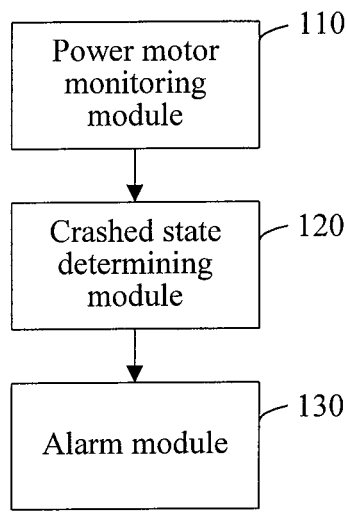
FIG. 5 is a block diagram of a drone control device according to an exemplary embodiment.

FIG. 5 is a block diagram of a drone control device according to an exemplary embodiment. The device includes, but not limited to: a power motor monitoring module 110, a crashed state determining module 120, and an alarm module 130.

The power motor monitoring module 110 is configured to monitor a running status of each power motor in a drone.

The crashed state determining module 120 is configured to determine according to the running status of each power motor whether the drone is in a crashed state.

The alarm module 130 is configured to controlling the drone to alarm when determining that the drone is in the crashed state.

For details about implementation processes of the functions and effects of the modules of the device, reference can be made to the implementation processes of the corresponding steps in the above drone control method, which will not be described herein again.

Figure 6:
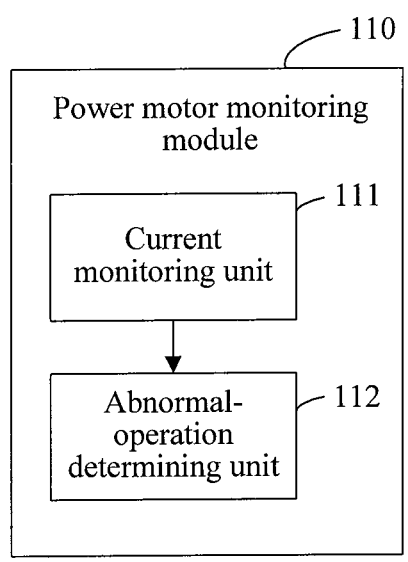
FIG. 6 is a block diagram of a power motor monitoring module 110 in the drone control device in the embodiment shown in FIG. 5.

Optionally, as shown in FIG. 6, the power motor monitoring module 110 of the drone control device in the embodiment shown in FIG. 5 includes, but not limited to: a current monitoring unit 111 and an abnormal-operation determining unit 112.

The current monitoring unit 111 is configured to monitor, for each power motor in the drone, a working current of the power motor.

The abnormal-operation determining unit 112 is configured to determine that the running status of the power motor is not the normal running state by comparing the working current with a normal working current.

Figure 7:
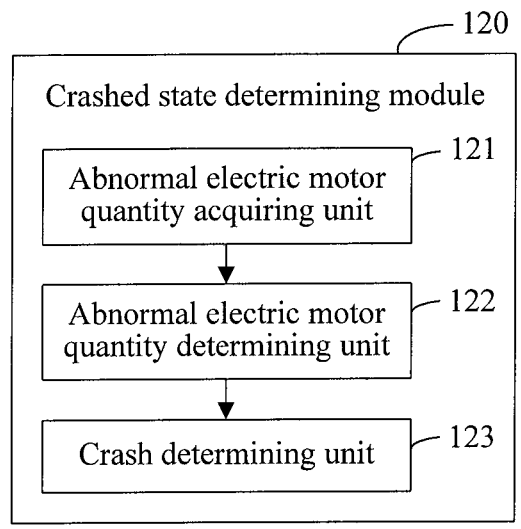
FIG. 7 is a block diagram of a crashed state determining module 120 in the drone control device in the embodiment shown in FIG. 5.

Optionally, as shown in FIG. 7, the crashed state determining module 120 of the drone control device in the embodiment shown in FIG. 5 includes, but not limited to: an abnormal electric motor quantity acquiring unit 121, an abnormal electric motor quantity determining unit 122 and a crash determining unit 123.

The abnormal electric motor quantity acquiring unit 121 is configured to acquire the quantity of power motors not in a normal running state in the drone according to the running status of each power motor.

The abnormal electric motor quantity determining unit 122 is configured to determine whether the quantity of power motors not in the normal running state reaches a preset crash critical quantity.

The crash determining unit 123 is configured to determine that the drone is in the crashed state when the quantity of power motors not in the normal running state reaches the preset crash critical quantity.

Optionally, the drone control device in the embodiment shown in FIG. 5 further includes, but not limited to: a shutdown control module.

a shutdown control module, configured to control, for the drone in the crashed state, all the power motors of the drone to enter a shutdown state.

Optionally, in the drone control device in the embodiment shown in FIG. 5, the alarm module 130 is specifically configured to control, for the drone in the crashed state, the power motors in the drone to produce an alarm sound.

Optionally, in the drone control device in the embodiment shown in FIG. 5, the alarm module 130 is specifically configured to control, for the drone in the crashed state, pulse width modulation (PWM) periods and duty cycles in the power motors of the drone to adjust currents of the power motors, to cause the power motors to vibrate and produce a sound.

Optionally, in the drone control device in the embodiment shown in FIG. 5, the alarm module 130 is specifically configured to control, for the drone in the crashed state, an alarm indicator light of the drone to flash as an alarm.

Figure 8:
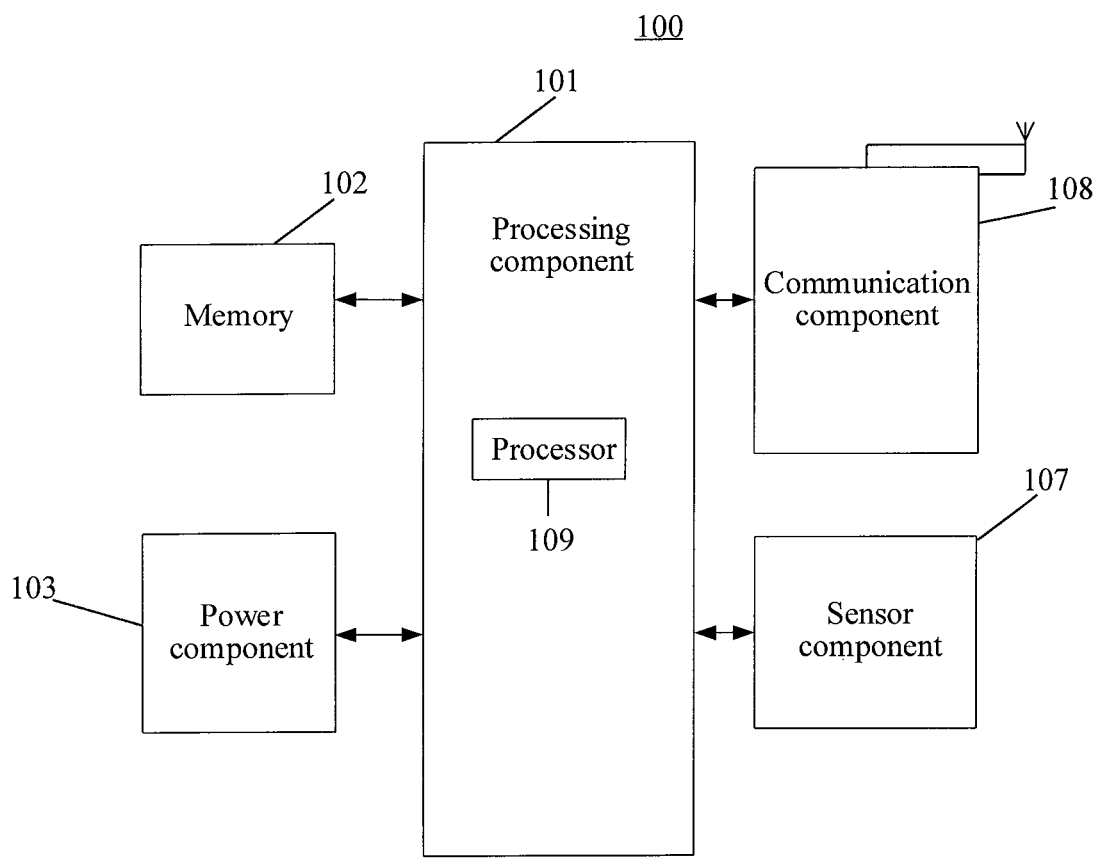
FIG. 8 is a structural block diagram of a terminal according to an exemplary embodiment.

FIG. 8 is a structural block diagram of a terminal 100 according to an exemplary embodiment. The terminal 100 may be the drone described in the foregoing embodiments, and configured to perform some or all of the steps of the method shown in any of FIG. 1, FIG. 2 and FIG. 3.

Referring to FIG. 8, the terminal 100 may include one or more of the following components: a processing assembly 101, a memory 102, a power supply assembly 103, a sensor component 107, and a communication assembly 108. The above components are not all necessary, and the terminal 100 may further include other components or omit some components depending on functional requirements, which is not limited in this embodiment.

The processing component 101 generally controls integral operations of the terminal 100, such as operations related to displaying, a phone call, data communication, a camera operation, and a record operation. The processing assembly 101 may include one or more processors 109 to execute instructions, to complete all or some steps of the foregoing operation. In addition, the processing assembly 101 may include one or more modules, to facilitate the interaction between the processing assembly 101 and other assemblies.

The memory 102 is configured to store data of various types to support operations on the terminal 100. Examples of the data include instructions of any application program or method that are used for operations on the terminal 100. The memory 102 may be implemented by any type of a volatile or nonvolatile storage device or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The memory 102 further stores one or more modules, and the one or more modules are configured to be executed by the one or more the processor 109, to implement all or some steps of the method shown in any of FIG. 1, FIG. 2, and FIG. 3.

The power supply assembly 103 provides power to various assemblies of the terminal 100. The power supply assembly 103 may include a power supply management system, one or more power supplies, and other assemblies associated with generating, managing and allocating power for the terminal 100.

The sensor assembly 107 includes one or more sensors, configured to provide status evaluation in each aspect to the terminal 100. For example, the sensor component 107 may detect a power-on/off state of the terminal 100 and a relative location of a component. The sensor component 107 may further detect changes in a location of the terminal 100 or a component of the terminal 100 and changes in a temperature of the terminal 100. In some embodiments, the sensor component 107 may further include a magnetic sensor, a pressure sensor, or a temperature sensor.

The communication assembly 108 is configured to facilitate communication in a wired or wireless manner between the terminal 100 and other devices. The terminal 100 may access a communications standard-based wireless network, such as WiFi, 2G, or 3G, or a combination thereof. In an exemplary embodiment, the communication assembly 108 receives a broadcast signal or broadcast related information from an external broadcast management system via a broadcast channel. In an exemplary embodiment, the communication assembly 108 further includes a near field communication (NFC) module, to promote short range communication. For example, the NFC module may be implemented based on a radio frequency identification (RFID) technology, an infrared data association (IrDA) technology, an ultra wideband (UWB) technology, a Bluetooth (BT) technology, and other technologies.

In an exemplary embodiment, the terminal 100 may be implemented by one or more application-specific integrated circuits (ASIC), digital signal processors (DSP), programmable logic devices (PLD), field programmable gate arrays (FPGA), controllers, microcontrollers, microprocessors, or other electronic components, and is configured to perform the foregoing method.

The specific manner in which the processor of the terminal in this embodiment executes operations has been described in detail in the embodiments of the drone control method, and therefore will not be detailed herein again.

Optionally, this application further provides a drone, configured to perform some or all of the steps of the drone control method shown in any of FIG. 1, FIG. 2 and FIG. 3. The drone includes:

at least one processor; and
a memory communicably connected to the at least one processor,
the memory storing instructions executable by the at least one processor, execution of the instructions by the at least one processor causing the at least one processor to execute the drone control method shown in any of the foregoing exemplary embodiments.

In an exemplary embodiment, a storage medium is further provided. The storage medium is a computer-readable storage medium. For example, the storage medium may be a transitory or non-transitory computer-readable storage medium including instructions. The storage medium is, for example, a memory 102 storing instructions, the instructions being executable by a processor 109 of a terminal 100 to implement the foregoing drone control method.

It should be understood that this application is not limited to the precise structures described above and shown in the accompanying drawings, and a person skilled in the art may make various modifications and changes without departing from the scope of this application. The scope of this application is limited only by the appended claims.

What is claimed is:

1. A drone control method, comprising:
monitoring a running status of each power motor in a drone;
determining according to the running status of each power motor whether the drone is in a crashed state; and
controlling the drone to alarm by an alarm giving unit when determining that the drone is in the crashed state;
wherein the step of determining according to the running status of each power motor whether the drone is in a crashed state comprises:
acquiring the quantity of power motors not in a normal running state in the drone according to the running status of each power motor;
determining whether the quantity of power motors not in the normal running state reaches a preset crash critical quantity, wherein the preset crash critical quantity is more than half of a total quantity of power motors;
if the quantity of power motors not in the normal running state reaches the preset crash critical quantity, determining that the drone is in the crashed state.

2. The method according to claim 1, wherein the step of monitoring the running status of each power motor in the drone comprises:
monitoring, for each power motor in the drone, a working current of the power motor; and
determining the running status of the power motor by comparing the working current with a normal working current.

3. The method according to claim 1, wherein before the step of controlling the drone to alarm when determining that the drone is in the crashed state, the method further comprises:
controlling, for the drone in the crashed state, all the power motors of the drone to enter a shutdown state.

4. The method according to claim 1, wherein the step of controlling the drone to alarm when determining that the drone is in the crashed state comprises:
controlling, for the drone in the crashed state, the power motors in the drone to produce an alarm sound.

5. The method according to claim 4, wherein the step of controlling, for the drone in the crashed state, the power motors in the drone to produce the alarm sound comprises:
controlling, for the drone in the crashed state, pulse width modulation (PWM) periods and duty cycles in the power motors of the drone to adjust currents of the power motors, to cause the power motors to vibrate and produce a sound.

6. The method according to claim 1, wherein the step of controlling the drone to alarm when determining that the drone is in the crashed state further comprises:
controlling, for the drone in the crashed state, an alarm indicator light of the drone to flash as an alarm.

7. A drone control device, comprising:
a power motor monitoring module, configured to monitor a running status of each power motor in a drone;
a crashed state determining module, configured to determine according to the running status of each power motor whether the drone is in a crashed state; and
an alarm module, configured to control the drone to alarm by the alarm giving unit when determining that the drone is in the crashed state;
wherein the crashed state determining module comprise;
an abnormal electric motor quantity acquiring unit, configured to acquire the quantity of power motors not in a normal running state in the drone according to the running status of each power motor;
an abnormal electric motor quantity determining unit configured to determine whether the quantity of power motors not in the normal running state reaches a preset crash critical quantity, wherein the preset crash critical quantity is more than half of a total quantity of power motors; and
a crash determining unit, configured to determine that the drone is in the crashed state when the quantity of power motors not in the normal running state reaches the preset crash critical quantity.

8. The device according to claim 7, wherein the power motor monitoring module comprises:
a current monitoring unit, configured to monitor, for each power motor in the drone, a working current of the power motor; and
an abnormal-operation determining unit, configured to determine the running status of the power motor by comparing the working current with a normal working current.

9. The device according to claim 7, wherein the device further comprises:
a shutdown control module, configured to control, for the drone in the crashed state, all the power motors of the drone to enter a shutdown state.

10. The device according to claim 7, wherein the alarm module is specifically configured to control, for the drone in the crashed state, the power motors in the drone to produce an alarm sound.

11. The device according to claim 10, wherein the alarm module is specifically configured to control, for the drone in the crashed state, pulse width modulation (PWM) periods and duty cycles in the power motors of the drone to adjust currents of the power motors, to cause the power motors to vibrate and produce a sound.

12. The device according to claim 7, wherein the alarm module is specifically configured to control, for the drone in the crashed state, an alarm indicator light of the drone to flash as an alarm.

13. A drone, comprising:
at least one processor; and
a memory communicably connected to the at least one processor,
the memory storing instructions executable by the at least one processor, wherein when the instructions is executed by the at least one processor, the at least one processor is configured to:
monitor a running status of each power motor in a drone;
determine according to the running status of each power motor whether the drone is in a crashed state; and
control the drone to alar by the alarm giving unit when determining that the drone is in the crashed state;
the at least one processor is further configured to;
acquire the quantity of power motors not in a normal running state in the drone according to the running status of each power motor;
determine whether the quantity of power motors not in the normal running state reaches a preset crash critical quantity, wherein the preset crash critical quantity is more than half of a total quantity of power motors; and
if the quantity of power motors not in the normal running state reaches the preset crash critical quantity, determine that the drone is in the crashed state.

14. The drone according to claim 13, the at least one processor is further configured to:
monitor for each power motor in the drone, a working current the power motor; and
determine the running status of the power motor by comparing the working current with a normal working current.

15. The drone according to claim 13, the at least one processor is further configured to:
control, for the drone in the crashed state, all the power motors pf the drone to enter a shutdown state.

16. The drone according to claim 13, the at least one processor is further configured to:
control, for the drone ire the crashed state, the power motors in the drone to produce an alarm sound.

17. The drone according to claim 16, wherein the at least one processor is further configured to:
control, for the drone in the crashed state, pulse width modulation (PWM) periods and duty cycles in the power motors of the drone to adjust currents of the power motors, to cause the power motors to vibrate and produce a sound.

18. The drone according to claim 13, wherein the at least ono processor is further configured to:
control, for the drone in the crashed state, an alarm indictor lit of the drone to flash as an alarm.

* * * * *